(12) United States Patent
Goeke et al.

(10) Patent No.: US 6,636,380 B2
(45) Date of Patent: Oct. 21, 2003

(54) HARD DISK DRIVE

(75) Inventors: Dale C. Goeke, Yokohama (JP);
Mutsuro Ohta, Yokohama (JP); Koichi Takeuchi, Yamato (JP); Shingo Tsuda, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 109 days.

(21) Appl. No.: 09/949,495

(22) Filed: Sep. 7, 2001

(65) Prior Publication Data

US 2002/0105754 A1 Aug. 8, 2002

(30) Foreign Application Priority Data

Sep. 8, 2000 (JP) ........................................ 2000-274041

(51) Int. Cl.[7] .............................................. G11B 17/08
(52) U.S. Cl. .................................................. 360/98.08
(58) Field of Search ........................... 360/97.01–99.12

(56) References Cited

U.S. PATENT DOCUMENTS 4,935,830 A  *  6/1990  Hiraoka ................... 360/98.01
6,307,706 B1 * 10/2001  Krum ...................... 360/98.08

* cited by examiner

*Primary Examiner*—A. J. Heinz
(74) *Attorney, Agent, or Firm*—Robert B. Martin; Bracewell & Patterson, L.L.P.

(57) ABSTRACT

A hard disk drive includes a spindle, a motor and multiple disks. The motor is attached to the spindle for rotatably turning the spindle along an axis of the spindle. The disks are disposed coaxially along the axis of the spindle. The distance between a first disk and a second disk is greater than the distance between the second disk and a third disk. The distance between the second disk and the third disk is greater than the distance between the third disk and a fourth disk. The first, second, third and fourth disks are located adjacent to each other consecutively.

5 Claims, 12 Drawing Sheets

[Figure 5]
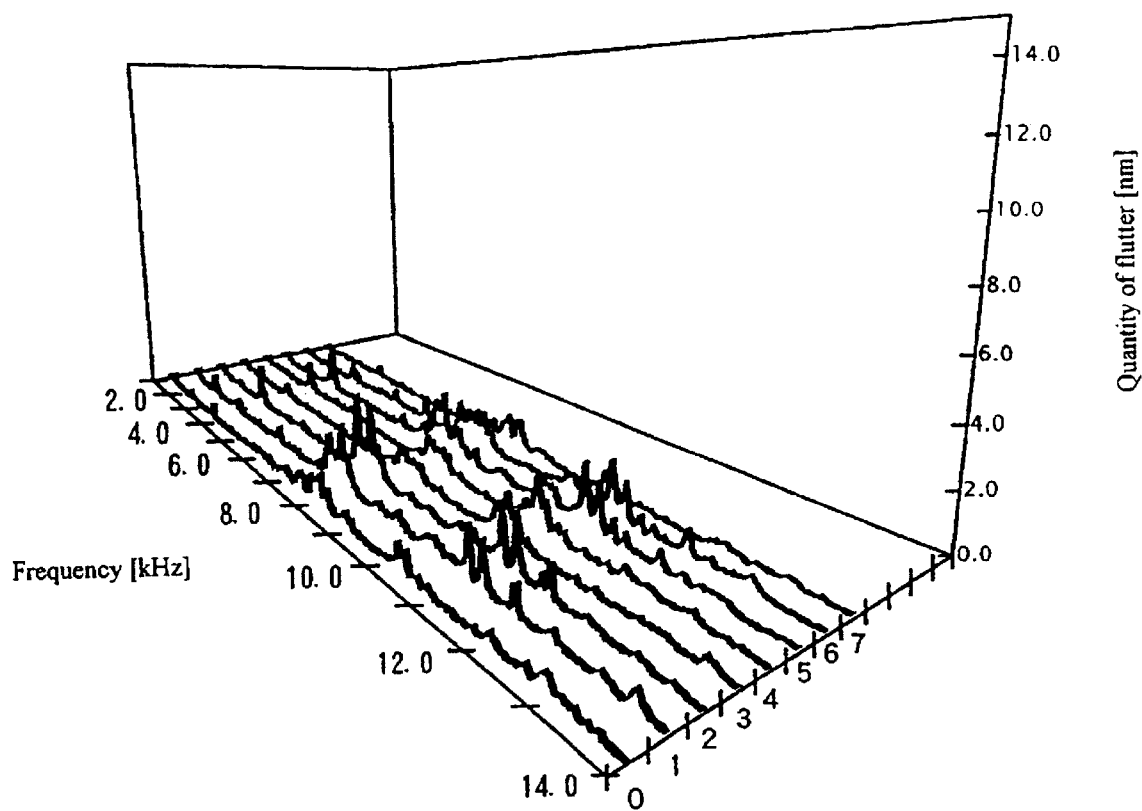

[Figure 6]
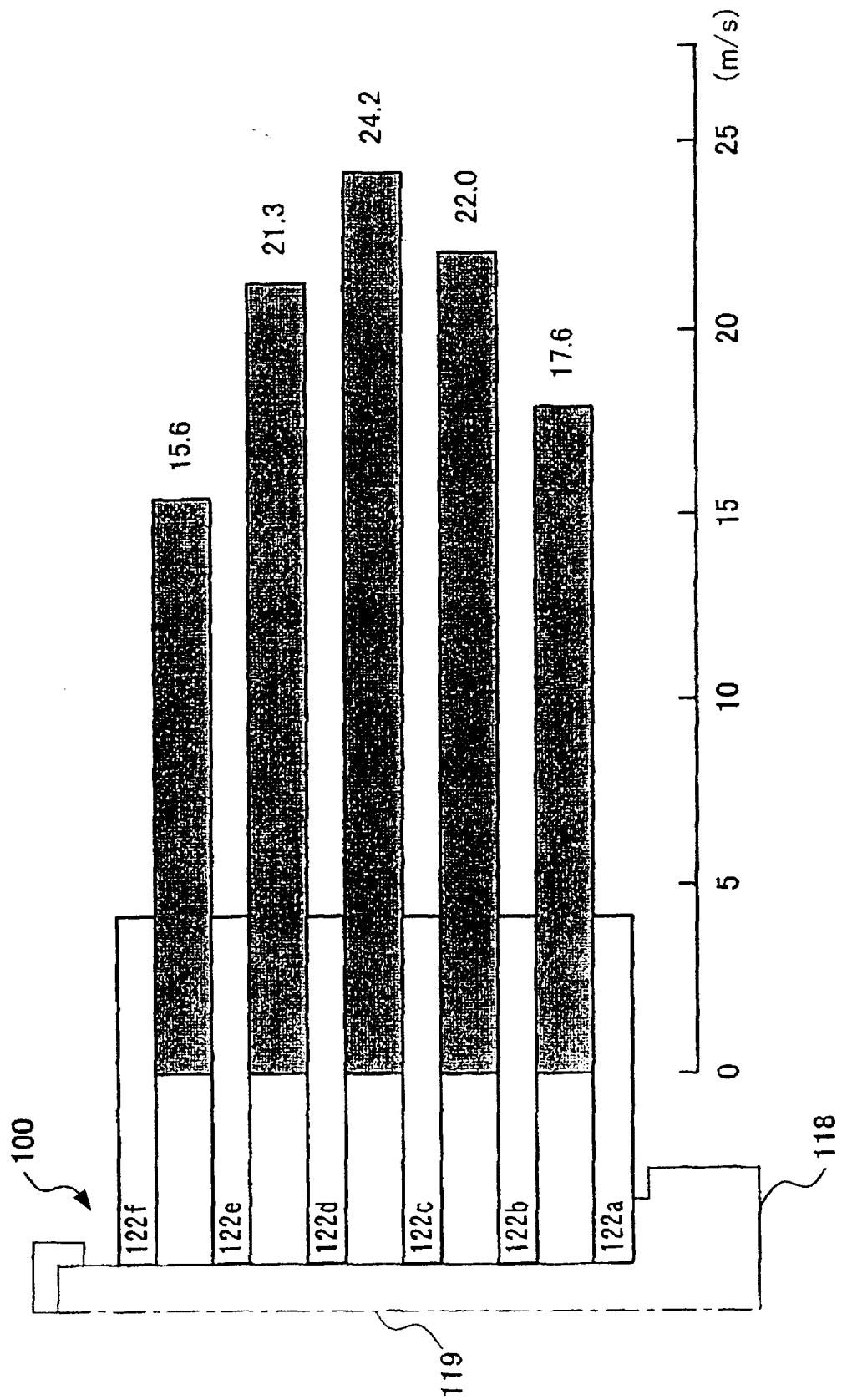

[Figure 7]
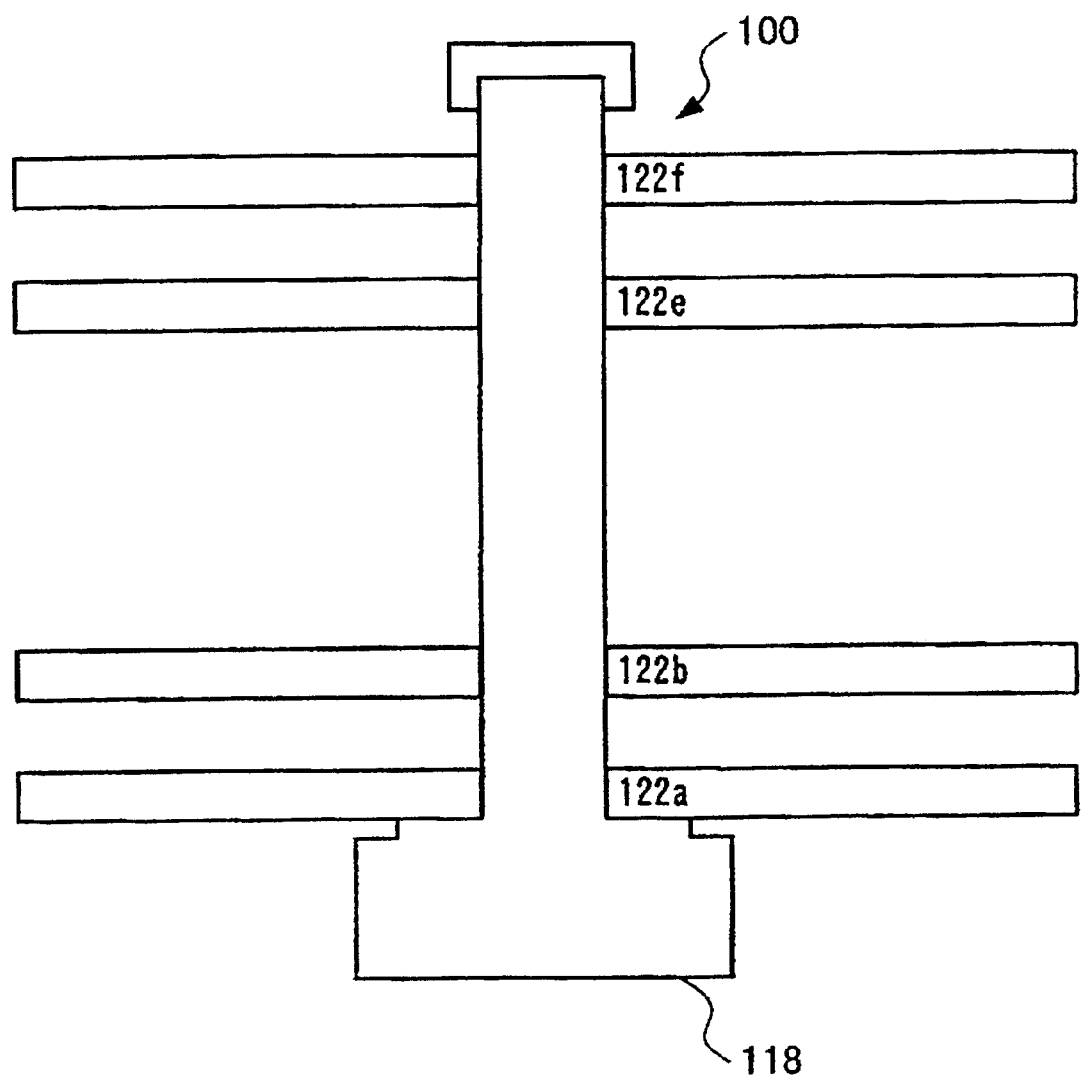

[Figure 8]
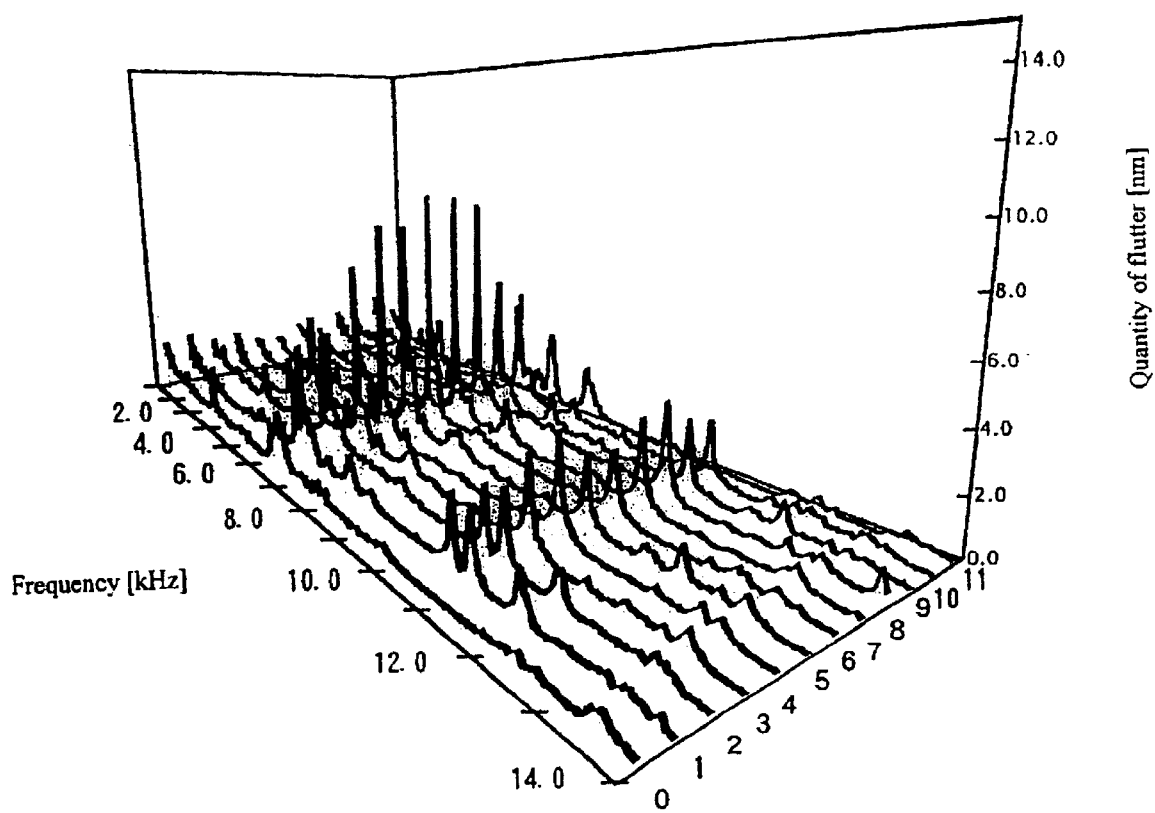

[Figure 9]
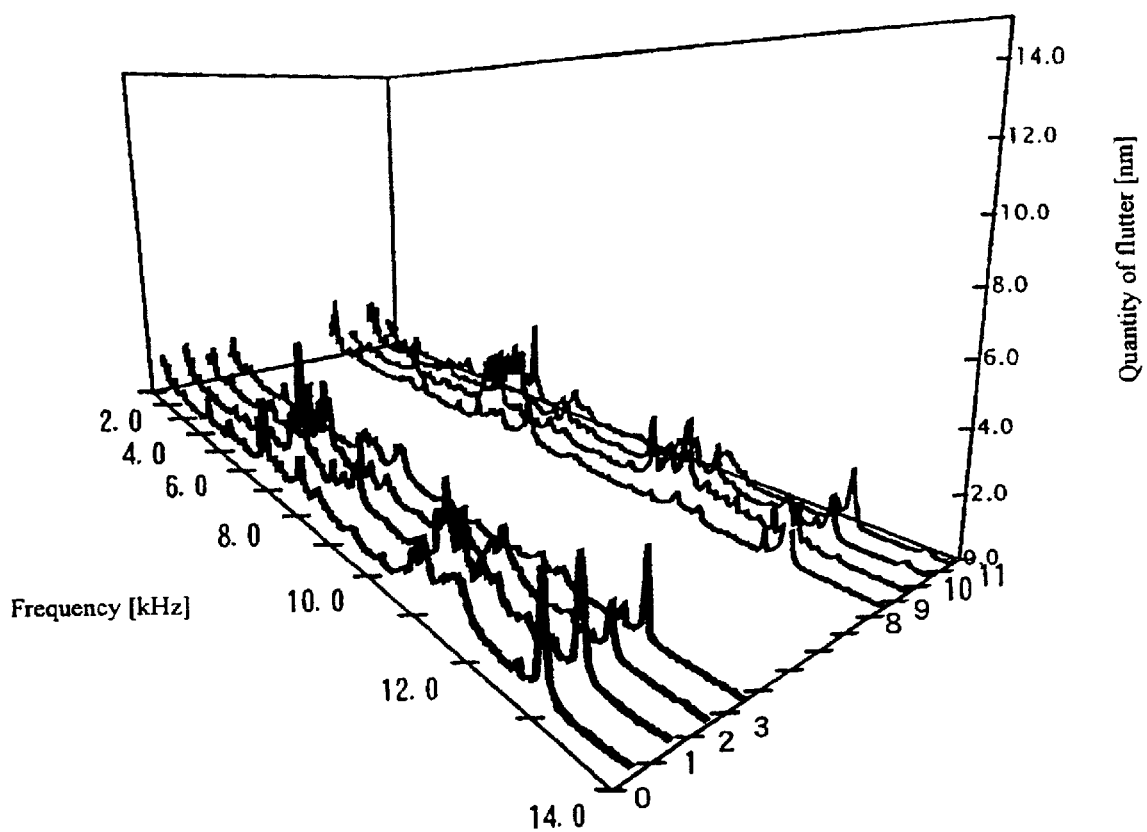

[Figure 10]
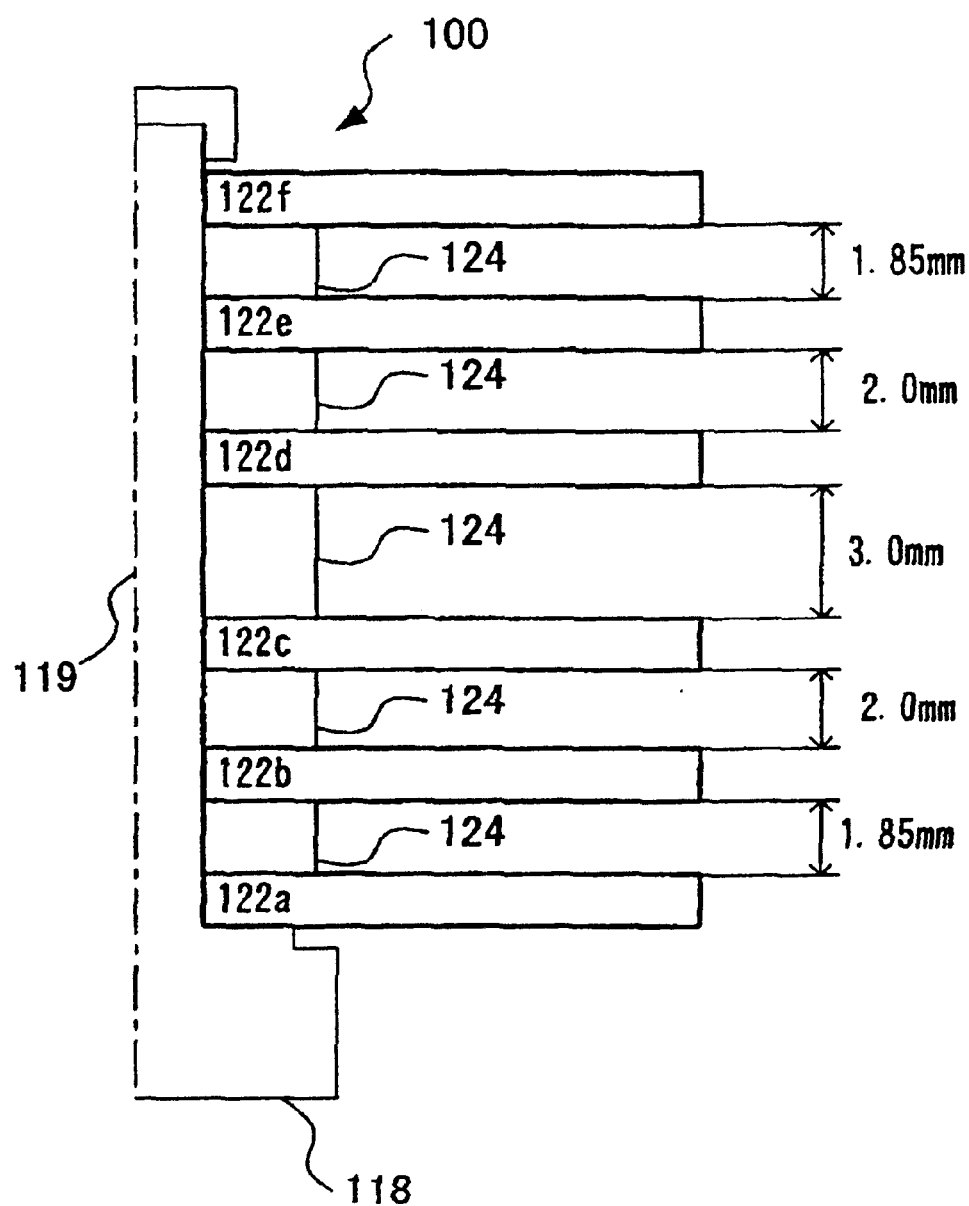

[Figure 11]
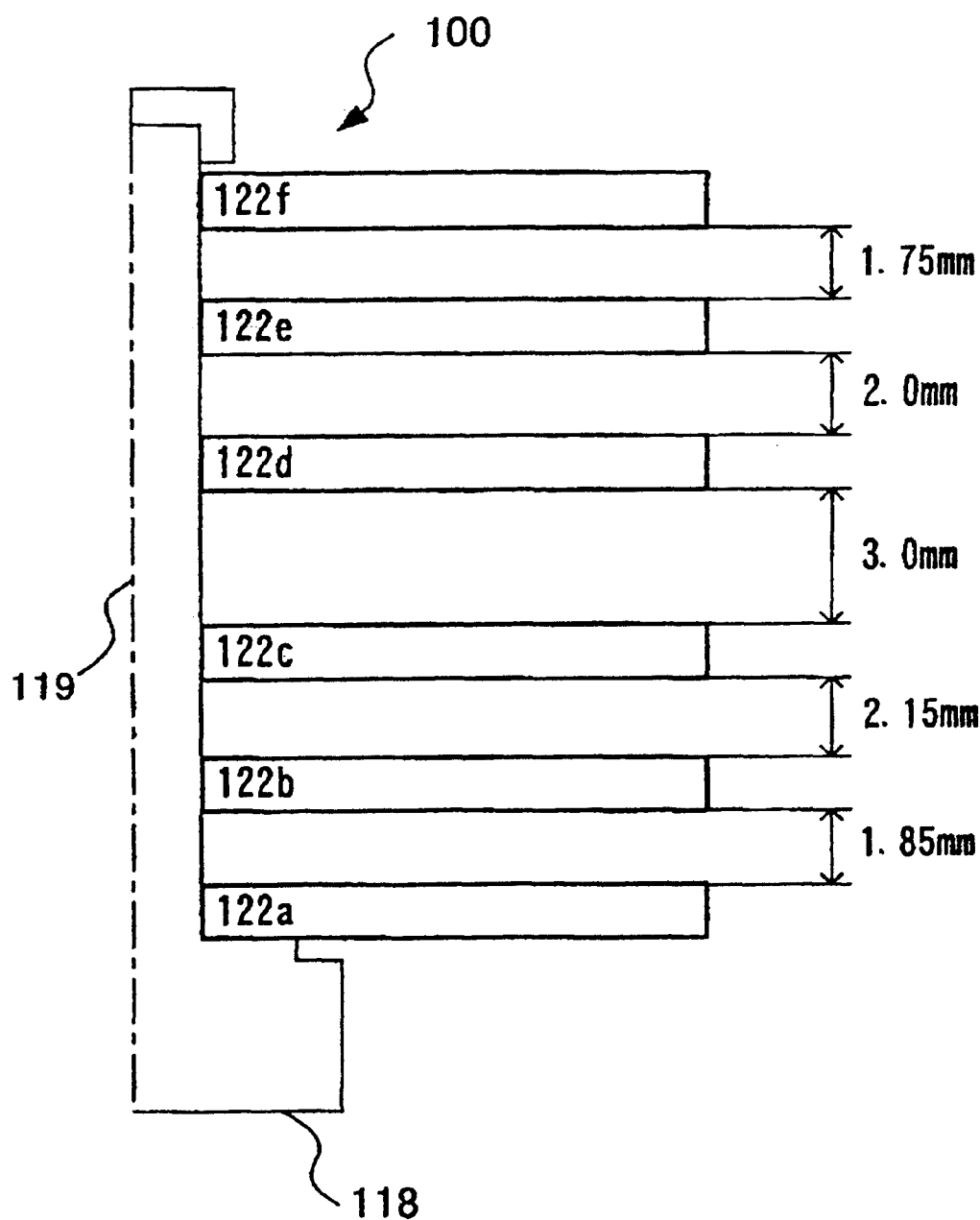

[Figure 12]
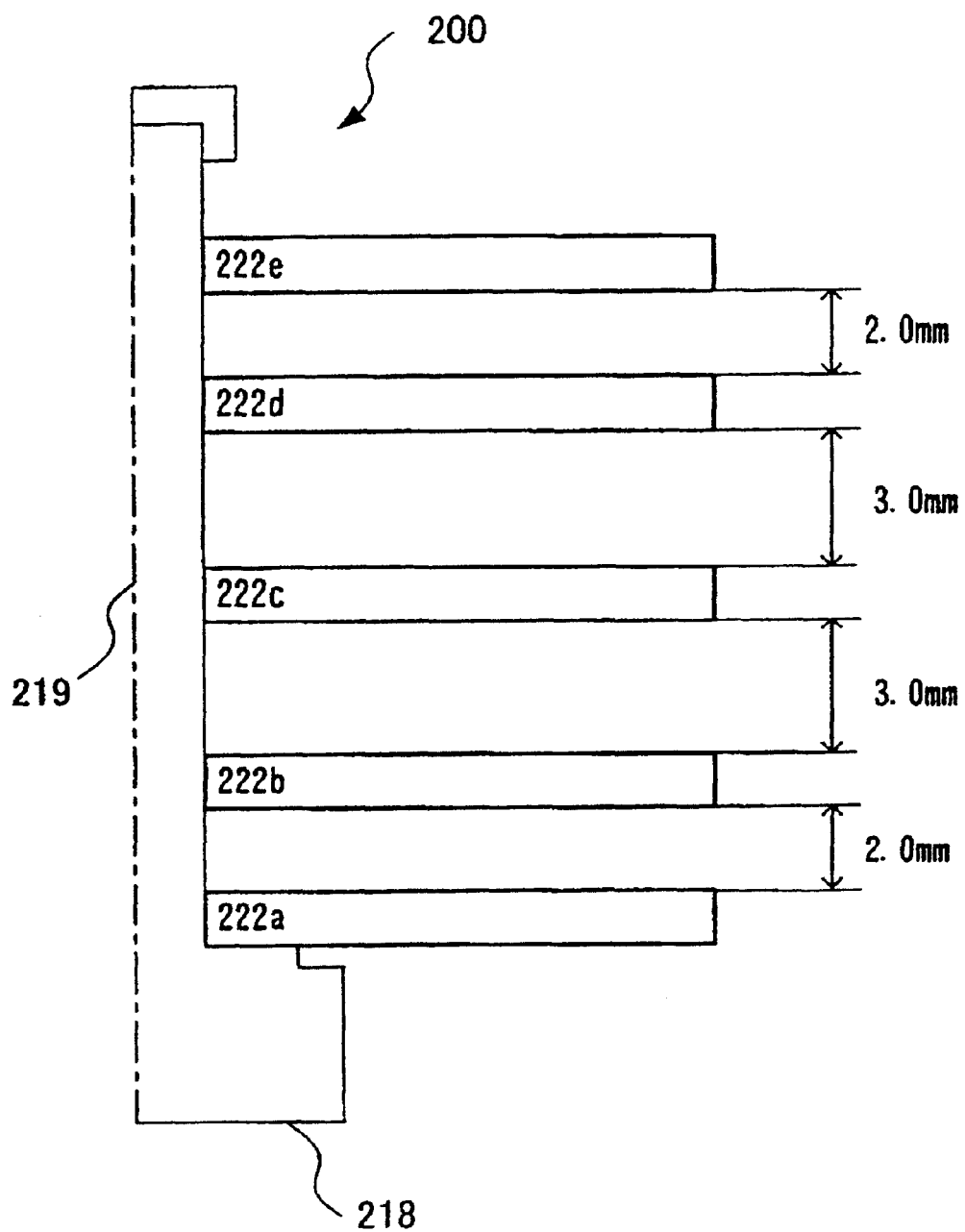

HARD DISK DRIVE

BACKGROUND OF THE INVENTION

1. Technical Field

The present invention relates to disk drive apparatuses that are employed as data storage means for computers.

2. Description of the Related Art

The most commonly used data storage means for computers are hard-disk drives (HDDs) having structures in which one or more magnetic disks are disposed coaxially and driven by a spindle motor. Data reading and writing are done by magnetic heads provided in opposition to the magnetic disks. The magnetic heads are driven by an actuator, generally a voice coil motor (hereinafter referred to as a VCM). The magnetic disks, the magnetic heads, and the actuator are stored in a housing called an enclosure case.

Two major performance concerns regarding an HDD are storage capacity per magnetic disk and read/write speed. Regarding the latter, data reading and writing speeds can be increased by shortening the seek time required to get a magnetic head to the required track on a magnetic disk. Because the magnetic head is driven by the VCM, as described above, it is possible to make the seek speed faster by enhancing the performance of the VCM. To enhance the VCM performance, the magnetic characteristic of the permanent magnets constituting the VCM can be made stronger, or the thickness can be adjusted to increase a magnetic field that is applied across the voice coil. There is a limit, however, to the extent to which the magnetic characteristic of the permanent magnets can be enhanced due to the practical limitations on increasing the thickness of the permanent magnet.

The speed of reading out or writing data can be enhanced by making the rotational speed of a magnetic disk faster. However, if the rotational speed of a magnetic disk is made faster, flutter of the magnetic disk will be increased. "Flutter" refers to a phenomenon in which a magnetic head oscillates in the radial direction of a magnetic disk because of a flow air created by the high rotational speed of the magnetic disk. If flutter occurs, the positional relationship between the magnetic head and the magnetic disk may be compromised. Increased flutter may therefore have an adverse effect on accuracy of data reading and writing (e.g. data may be written to or read from the wrong track). As storage densities increase, the negative effects of flutter are magnified.

The rotational speed of a 3.5-in magnetic disk has conventionally been 7200 rpm, with rotational speeds of 10000 rpm for more currently being adopted. Flutter becomes more pronounced as the flow velocity (flow velocity) of air occurring between magnetic disks increases. The velocity (flow velocity) of the flow of air occurring between magnetic disks increases as the rotational speed of a magnetic disk increases. Therefore, if the rotational speed of magnetic disks in an HDD is increased, the problem of erroneous data reads and writes due to flutter also increases.

In addition to inducing data reading and writing errors, flutter is an important consideration in the manufacturing and assembly of HDDs. In most cases, a plurality of magnetic disks are mounted in the HDD. If there is a difference in the flutter characteristic between magnetic disks mounted within a single HDD, it is necessary to design in compensation for such flutter disparities.

From the foregoing, it can be appreciated that a need exists for a disk drive apparatus which, in a high-speed HDD, is capable of reducing the velocity of a flow of air occurring near magnetic disks during rotation of the magnetic disks so that flutter occurrence can be suppressed. It would further be useful to provide a disk drive apparatus which, in a HDD with a plurality of magnetic disks, is capable of equalizing the velocities of the flows of air between the magnetic disks.

SUMMARY OF THE INVENTION

A disk drive apparatus and method applicable therein for reducing disk flutter and the negative effects thereof are disclosed herein. The apparatus of the present invention includes a hard disk drive unit including a motor that rotatably drives multiple disk data storage media. The hard disk drive unit further includes a disk assembly in which the disk storage media are disposed coaxially in sequence with predetermined spaces from the motor, wherein a space between axially centered disk storage media within the multiple disk storage media is set greater than the other spaces between disk storage media.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a graph showing quantities of flutter measured by employing the HDD depicted in FIGS. 1 and 2;

FIG. 6 illustrates measurement results of a velocity of flow of air between the disks of a HDD having six magnetic disks;

FIG. 7 is a cross-section view showing a state in which two center magnetic disks have been removed from the HDD shown in FIG. 6 in accordance with one embodiment of the present invention;

FIG. 8 is a graph showing measurement results of flutter for the HDD shown in FIG. 6;

FIG. 9 is a graph showing measurement results of flutter with two center magnetic disks removed from the HDD shown in FIG. 6;

FIG. 10 is a cross-section diagram illustrating spaces between magnetic disks in the HDD shown in FIG. 6 set in accordance with one embodiment of the present invention;

FIG. 11 is a cross-section diagram depicting spaces between magnetic disks in the HDD shown in FIG. 6 set in accordance with an alternate embodiment of the present invention; and FIG. 12 is a cross-section diagram illustrating spaces between magnetic disks in a HDD having five magnetic disks set in accordance with an alternate embodiment of the present invention.

DETAILED DESCRIPTION OF THE PREFERRED EMBODIMENT

Figure 1:
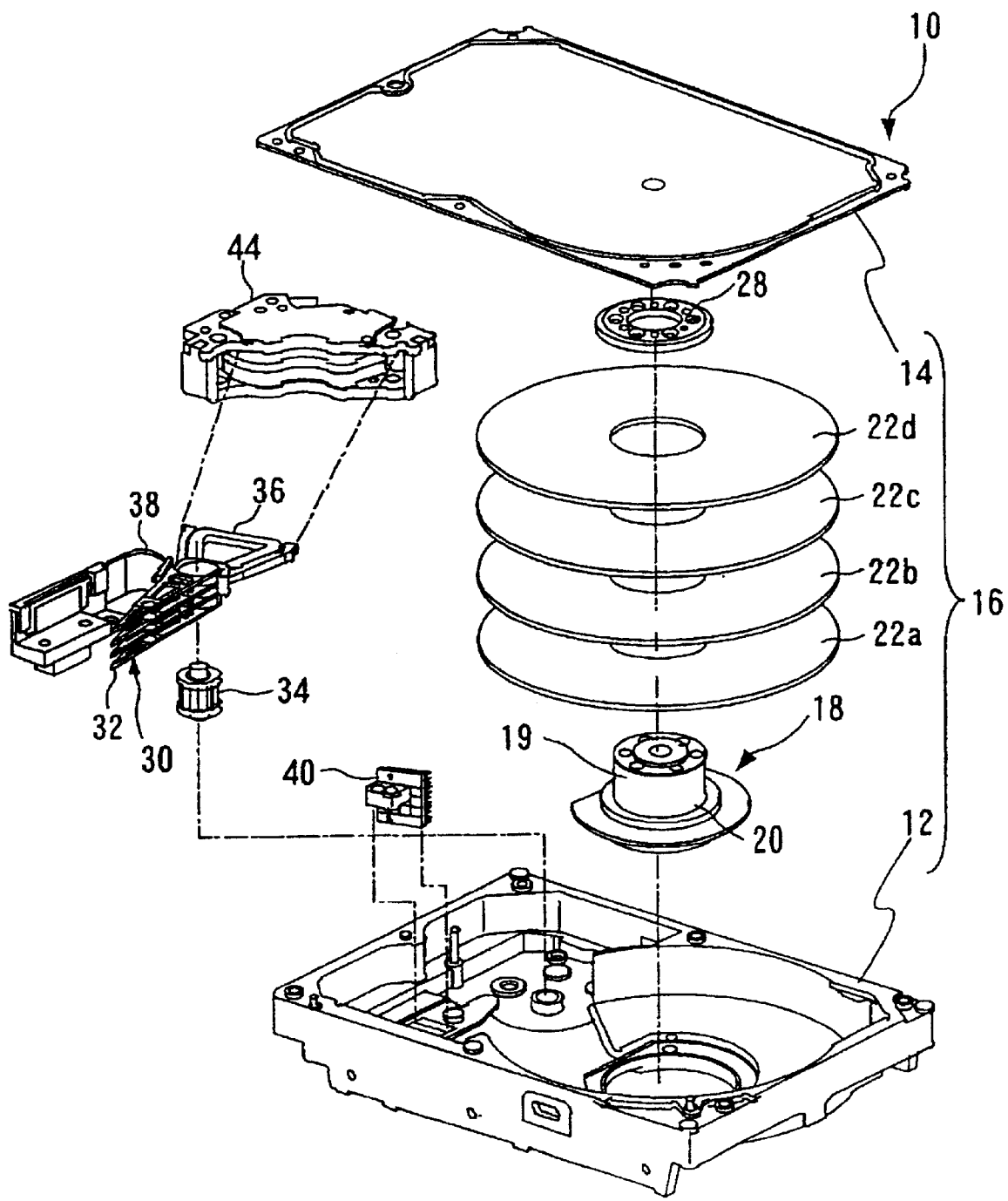
FIG. 1 is an exploded perspective view of a hard disk drive (HDD) having four mounted magnetic disks in accordance with a first embodiment of the present invention.

The present inventors have measured the velocity of the flow of air between the magnetic disks of a HDD and found the following facts. Note that this HDD has mounted 6 (six) magnetic disks. Also, the magnetic disk disposed at the position nearest to the spindle motor is referred to as disk 1, and the magnetic disk positioned above the disk 1 is referred to as disk 2. In the same way, the uppermost magnetic disk is referred to as disk 6.

(1) The flow velocities between the magnetic disks, such as flow velocity between the disks 1 and 2, flow velocity between the disks 2 and 3, etc., are unequal and there is a great difference in flow velocity.

(2) The flow velocity between the disks 3 and 4 is fastest. That is, the flow velocity between two axially center disks of the six magnetic disks is fastest. Also, the flow velocity becomes slower in the order of the flow velocity between the disks 4 and 5, the flow velocity between the disks 2 and 3, the flow velocity between the disks 5 and 6, and the flow velocity between the disks 1 and 2.

(3) Comparing the flow velocity between the disks 4 and 5 with the flow velocity between the disks 2 and 3, the flow velocity between the disks 4 and 5 is greater. Comparing the flow velocity between the disks 5 and 6 with the flow velocity between the disks 1 and 2, the flow velocity between the disks 5 and 6 is faster.

After obtaining the aforementioned facts, the present inventors have measured flutter. As a result, it has been confirmed that the magnitude of flutter is approximately proportional to the flow velocity between magnetic disks. It has also been confirmed that if flutter is measured with the disks 3 and 4, i.e., two axially center magnetic disks removed, the magnitude of flutter is considerably reduced. This indicates that, by increasing the space between two disks, flow velocity is reduced and flutter can be suppressed. It also implies that, in a HDD having mounted a plurality of magnetic disks, the flow velocities between magnetic disks can be made equal and the magnitudes of flutter can be made uniform, by adjusting, as appropriate, the spaces between magnetic disks.

In accordance with the aforementioned facts found by the present inventors, there is provided a disk drive apparatus comprising: a motor to drive a plurality of disk data storage media to rotate; a disk assembly in which the plurality of disk storage media are disposed coaxially in sequence with predetermined spaces from the motor; and a plurality of heads, disposed in opposition to the plurality of disk storage media, for performing data storage and reproduction; wherein a space between axially center disk storage media of the plurality of disk storage media is set greater than the other spaces between disk storage media.

Because the disk drive apparatus of the present invention sets the space between axially center disk storage media greater than the other spaces between disk storage media, the velocity of the flow of air in the axially center space can be reduced. Therefore, flutter in the center space between the axially center disk storage media can be suppressed.

In the disk drive apparatus of the present invention, a space between the axially center disk storage media can be defined as follows. For instance, in the case where there are provided an m number of disk storage media (where m is an even of 4 or more), the space between the ½·mth disk storage medium and the ½·(m+1)st disk storage medium, counted from the disk storage medium disposed at the position nearest to the aforementioned motor, corresponds to the space between the axially center disk storage media. In the case where there are provided an n number of disk storage media (where n is an odd of 5 or more), the space between the ½·(n−1)st disk storage medium and the ½·(n+1)st disk storage medium and the space between the ½·(n+1)st disk storage medium and the ½·(n+3)rd disk storage medium, counted from the disk storage medium disposed at the position nearest to the motor, correspond to the space between the axially center disk storage media. Therefore, in the present invention, the disk assembly disposes an m number of disk storage media (where m is an even of 4 or more), and a space between the ½·mth disk storage medium and the ½·(m+1)st disk storage medium, counted from the disk storage medium disposed at the position nearest to the motor, is set greater than the other spaces between disk storage media. In addition, the disk assembly disposes an n number of disk storage media (where n is an odd of 5 or more), and a space between the ½·(n−1)st disk storage medium and the ½·(n+1)st disk storage medium and a space between the ½·(n+1)st disk storage medium and the ½·(n+3)rd disk storage medium, counted from the disk storage medium disposed at the position nearest to the motor, are set greater than the other spaces between disk storage media.

In a preferred form of the disk drive apparatus of the present invention, the disk assembly satisfies a relationship of $G1 > G2 > G4$ where $G1$ represents a space between the ½·mth disk storage medium and the ½·(m+2)nd disk storage medium, counted from the disk storage medium disposed at the position nearest to the motor, $G2$ represents a space between the ½·mth disk storage medium and the ½·(m−2)nd disk storage medium, and $G4$ represents a space between the ½·(m−2)nd disk storage medium and the ½·(m−4)th disk storage medium. The disk assembly further satisfies a relationship of $G1 > G3 > G5$ where $G3$ represents a space between the ½·(m+2)nd disk storage medium and the ½·(m+4)th disk storage medium, counted from the disk storage medium disposed at the position nearest to the motor, and $G5$ represents a space between the ½·(m+4)th disk storage medium and the ½·(m+6)th disk storage medium.

In this disk assembly, the axially center space $G1$ is set greater than the other spaces. Therefore, the velocity of the flow of air occurring in the axially center space $G1$ can be reduced. Besides, the spaces between disk storage media are set so that they become narrower, as it goes away from the axially center space. This setting is inversely proportional to the magnitudes of the flows of air in the case where the spaces between disk storage media are uniformly disposed. Note that if the space between disk storage media becomes wider the velocity of the flow of air becomes slower, and if it becomes narrower the flow velocity becomes faster. Therefore, it becomes possible to equalize the velocities of the flows of air in the spaces between disk storage media.

One of the applications as the disk drive apparatus of the present invention is a HDD. In the case of a HDD, the space between the magnetic disks is controlled with a disk spacer. In accordance with the present invention, therefore, there is provided a hard disk drive in which four or more magnetic disks for storing data magnetically are disposed coaxially, the hard disk drive comprising: a spindle motor to drive the magnetic disks to rotate; and a plurality of disk spacers, disposed coaxially with the magnetic disk, for controlling a distance between adjacent magnetic disks, wherein there is a relationship of $t1 > t2$ where $t1$ represents a thickness of an axially center disk spacer of the plurality of disk spacers and $t2$ represents a thickness of the disk spacer other than the axially center disk spacer.

It is desirable that, in the case where the HDD of the present invention has a form factor size of 3.5 in, the thickness t1 be 2.5 mm or greater, and the thickness t2 be 2.0 mm or less. If disk spacers are made in this range, the velocity of a flow of air occurring in the space between magnetic disks can be suppressed in a range where flutter has no adverse effect on data writing and reading. The numerical values of the thickness t1 and thickness t2 are determined depending on the size and number of magnetic disks to be mounted. For instance, the upper limit value of t1 and the lower limit value of t2 are dependent largely on the number of magnetic disks mounted.

In addition, while the HDD of the present invention can be applied to a low-speed HDD, it is desirable to apply it to a high-speed HDD where the rated rotational speed is 10000 rpm or greater.

Furthermore, in accordance with the present invention, there is provided a disk drive apparatus comprising: a disk assembly in which a plurality of disk data storage media are disposed coaxially and spaces between adjacent disk storage media become unequal; a motor for driving the plurality of disk data storage media to rotate; and a plurality of heads, disposed in opposition to the plurality of disk data storage media, for performing data storage and reproduction.

Because the spaces between disk storage media in the conventional disk drive apparatus are equal, the velocities of the flows of air between disk storage media becomes unequal. However, the disk drive apparatus of the present invention makes the spaces between adjacent disk storage media unequal, thereby having the possibility that the velocities of the flows of air occurring in the unequal spaces will become equal. In a preferred form of the disk drive apparatus, the spaces between adjacent disk storage media in the disk assembly are set unequal in accordance with the rotation of said disc data storage medium based on velocities of flows of air that, when spaces between disk storage media are made equal, occur in the equal spaces. If done in this manner, it becomes possible to equalize the velocities of the flows of air in the spaces between adjacent storage media in the disk assembly.

The HDD drives magnetic disks to rotate by a spindle motor. The spindle for mounting magnetic disks is supported at both ends thereof. The positions of the magnetic disks can be specified by the support positions. Therefore, in accordance with the present invention, there is provided a hard disk drive comprising: four or more magnetic disks, coaxially disposed with predetermined spaces, for storing data magnetically; and a spindle to mount the magnetic disks thereon, the spindle having support positions at both ends thereof, wherein the predetermined spaces are determined based on a distance from the support position.

In a preferred form of the hard disk drive, the space between the magnetic disks near the support position is set narrow and the space between the magnetic disks at the central portion between the support positions is set wide.

A first embodiment of the present invention will hereinafter be described with reference to the drawings.

FIG. 1 shows an exploded perspective view of a HDD 10 according to the first embodiment. Note that the HDD 10 in the first embodiment has a form factor of 3.5 in and a rated rotational speed of 10000 rpm.

In the HDD 10, the top opening of an aluminum alloy base 12 in the form of a shallow box is sealed with a top cover 14, as illustrated in FIG. 1. They form an enclosure case 16, which is in the form of a thin rectangular box and can be horizontally disposed inside a computer or keyboard.

The SUS-430 top cover 14 is screwed to the base 12 through a rectangular seal member (not shown), whereby the enclosure case 16 is hermetically sealed.

Within this enclosure case 16, a spindle motor 18 of hub-in structure is provided at a position slightly offset from the center of the base 12 toward the edge. On the upper surface of the hub 20 of this spindle motor 18, magnetic disks 22a, 22b, 22c, and 22d, which consist of a glass or aluminum substrate, are fixedly mounted with a top clamp 28 and are driven to rotate with the spindle motor 18. The upper end of the spindle 19 of the spindle motor 18 is fixed to the top cover 14 by means of bolts (not shown). Thus, the spindle 19 has double-end supported structure.

Figure 2:
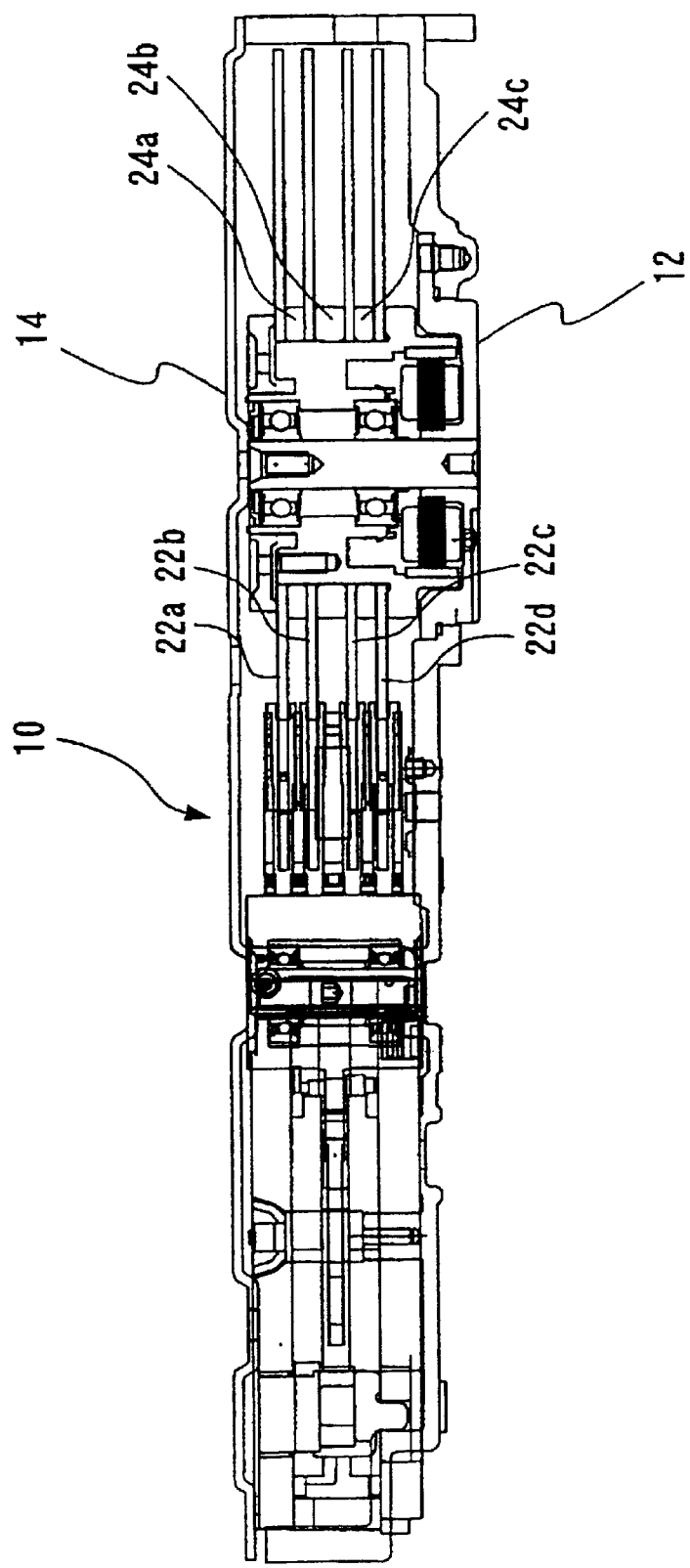
FIG. 2 is a sectional view of the HDD depicted in FIG. 1.

The magnetic disks 22a, 22b, 22c, and 22d are disk storage media for storing data. Data is stored on a magnetic thin film formed on the glass substrate. As illustrated in FIG. 2, the magnetic disks 22a, 22b, 22c, and 22d are stacked with spacers 24a, 24b, and 24c between them. The spacers 24a, 24b, and 24c are members for controlling the spaces between the magnetic disks.

In the first embodiment, the spacer 24a, disposed nearest from the spindle motor 18, and the spacer 24c, disposed nearest to the spindle motor 18, are 2 mm in thickness, and the thickness of the axially center spacer 24b, disposed between the spacers 24a and 24c, is 3 mm. Therefore, the space between the magnetic disks 22b and 22c becomes 3 mm, while the space between the magnetic disks 22a and 22b, and the space between the magnetic disks 22c and 22d, become 2 mm. In other words, the space between the axially center magnetic disks is set greater than that between the other magnetic disks.

In addition, the actuator 30 is provided within the enclosure case 16. This actuator 30 has a magnetic head 32 at its one and is supported at its intermediate portion on the base 12 through a pivot 34. The actuator 30, therefore, is free to rotate on the pivot 34. The actuator 30 is provided at the other end thereof with a voice coil motor coil 36 and is rotated by a VCM 44, provided within the enclosure case 16, which cooperates with the VCM coil 36.

Attached to the exterior surface (bottom surface) of the base 12 is a card (not shown) as a circuit board. This card is rectangular in shape and covers the exterior surface of the base 12. Input and output of electric power, signals, etc., for driving motors, are performed between the aforementioned card and the above-mentioned spindle motor 18. In addition, input and output of electric power and signals, for power to the VCM coil 36, read and write operations by the magnetic head 32, etc., are performed between the card and the actuator 30. The input and output, between the card and the actuator 30, are performed through a flexible cable (FPC) 38.

The HDD 10 of the first embodiment is a HDD called a head loading-unloading type. The head loading-unloading type HDD 10 unloads the magnetic head 32 to a save position without contacting the head 32 with the magnetic disk surface, by holding the actuator 30 at a ramp block 40 during non-operation. During operation, the actuator 30 is driven so that the magnetic heads 32 is located over the magnetic disk.

Figure 3:
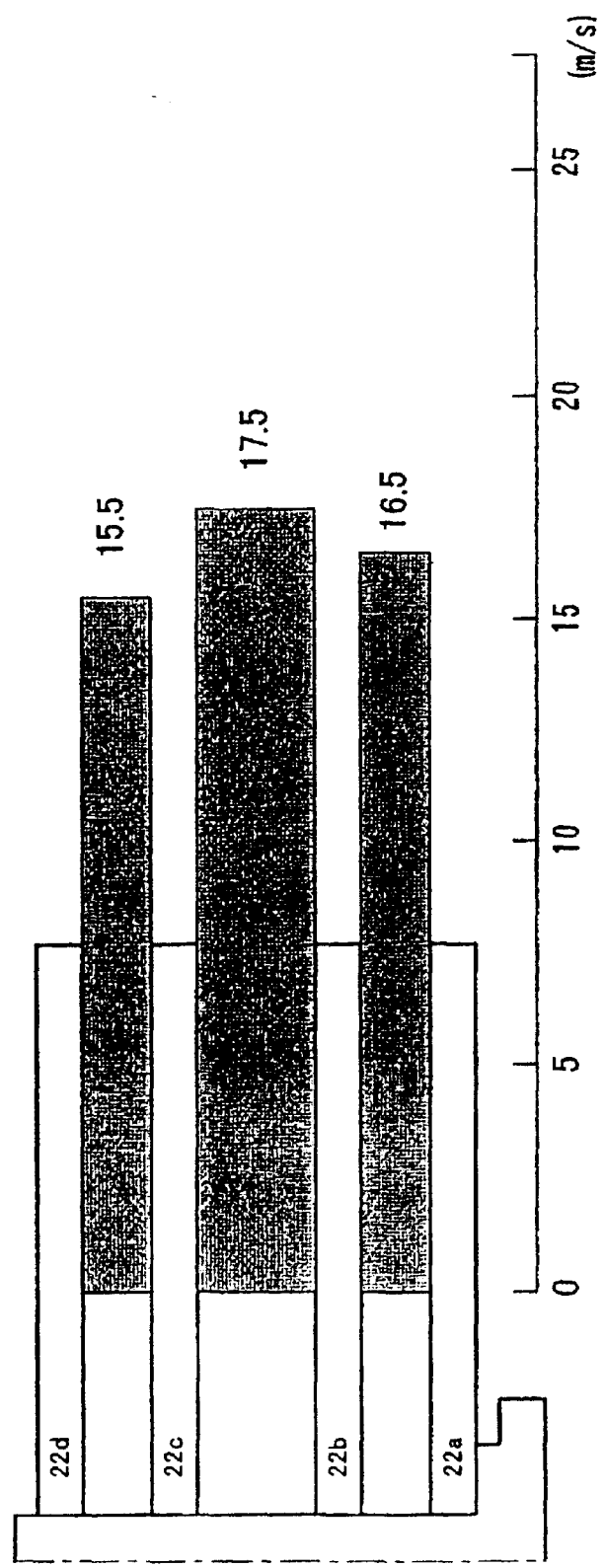
FIG. 3 is a graph showing measurement results of a velocity of flow of air between the magnetic disks of the HDD illustrated in FIGS. 1 and 2.
Figure 4:
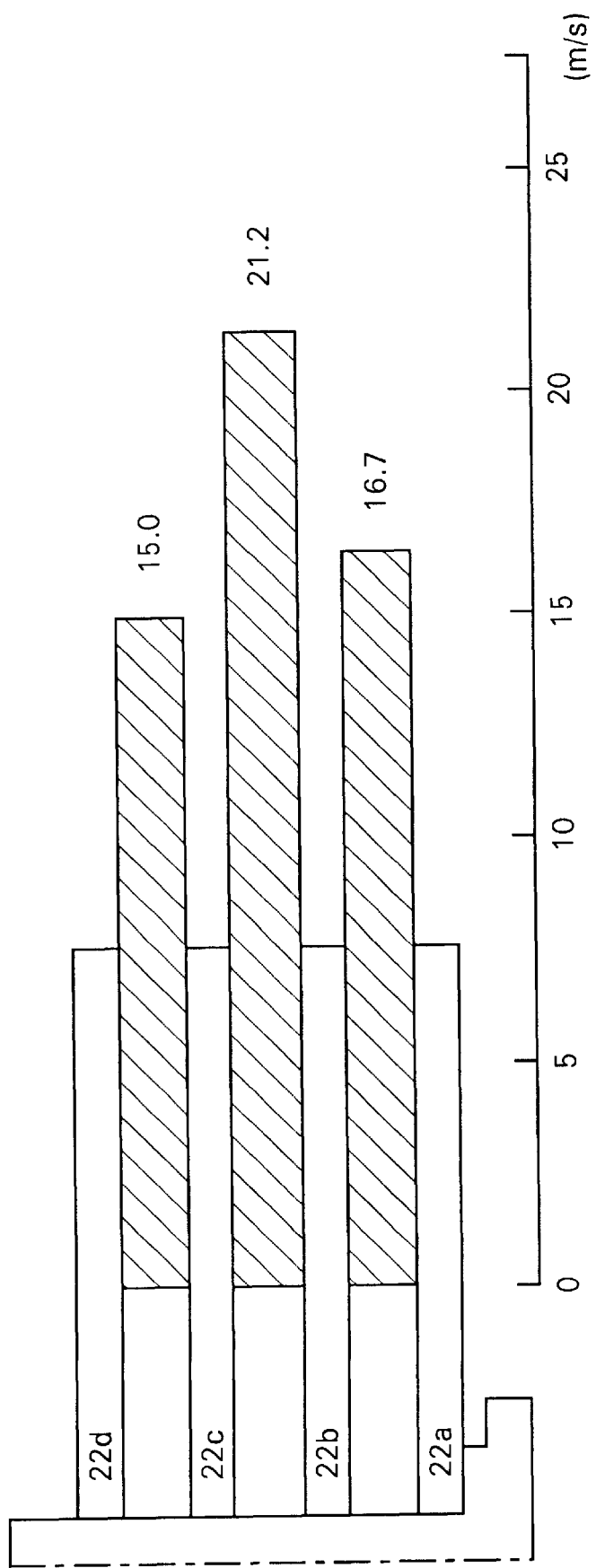
FIG. 4 is a graph showing measurement results of a velocity of flow of air between the disks of a conventional HDD having disposed four magnetic disks at equal spaces.

Flow velocities were measured in the spaces between adjacent magnetic disks by employing the HDD 10 mentioned above. The results are shown in FIG. 3. Similarly, flow velocities were measured by employing a similar HDD as the first embodiment, except that the spaces between magnetic disks are all 2 mm. The results are shown in FIG. 4. In FIGS. 3 and 4, the disk assembly, constructed of the magnetic disk 22a and the spindle motor 18, is schematically shown and the flow velocities are illustrated as histograms. The substrate of each of the magnetic disks 22a, 22b, 22c, and 22d was constructed of a glass substrate of thickness 1.0 mm, and peripheral flow velocities were en measured at a point of radius 40 mm. The rotational speed of the magnetic disk is 10000 rpm.

As illustrated in FIG. 4, it is found that in the conventional HDD where the spaces between the magnetic disks are uniform, the flow velocity in the space between the magnetic disk 22b and the magnetic disk 22c is the greatest. Although the flow velocity in the space between the magnetic disks 22a and 22b is approximately the same as that between the magnetic disks 22c and 22d, the former is slightly greater. There is a possibility that the flow velocity in the space between the magnetic disks 22b and 22c will cause the problem of flutter.

According to the HDD 10 of the first embodiment, on the other hand, the flow velocity in the space between the magnetic disks 22a and 22b, the flow velocity in the space between the magnetic disks 22b and 22c, and the flow velocity in the space between the magnetic disks 22c and 22d, are approximately the same, as illustrated in FIG. 3. In addition, the value of the flow velocity is much smaller than that of the flow velocity in the space between the magnetic disks 22b and 22c in the conventional HDD. Therefore, the HDD 10 in the first embodiment is capable of avoiding the problem of flutter.

From the graphs shown in FIGS. 3 and 4, the following can be found.

In the case where the spaces between adjacent magnetic disks are equal, the flow velocities between magnetic disks become unequal. However, the air flow velocities between magnetic disks can be made equal by setting the spaces between magnetic disks unequal, based on the unequal air flow velocities between magnetic disks. That is, it becomes possible to make the air flow velocities between magnetic disks equal by adjusting the spaces between magnetic disks.

Since the flow velocity in the space between the magnetic disks positioned in the axially center portion of the spindle 19 becomes greatest, the flow velocity can be reduced by making that space greater than the other spaces. As previously described, the spindle 19 is supported at both ends thereof. Therefore, the velocity of the flow of air in each space between the magnetic disks can be adjusted by determining the spaces between the magnetic disks in accordance with a distance from the position at which the spindle 19 is supported. Note that this adjustment is based on the assumption that the space between the magnetic disks, in the intermediate portion between the aforementioned two support positions, is made greater than the other spaces.

Next, the quantity of flutter was measured by employing the HDD 10 of the first embodiment. The results are shown in FIG. 5. In FIG. 5, the vertical axis indicates the oscillating width (quantity of flutter) of the magnetic head 32, and the horizontal axis indicates frequencies. Also, the numbers 1 through 7 in FIG. 5 denote eight magnetic heads 32 mounted in the HDD 10. The number 0 indicates the magnetic head 32 on the side of the spindle motor 18, i.e., at the lowest position, while the number 7 indicates the magnetic head 32 located at the uppermost position. As illustrated in FIG. 5, it has been confirmed that the oscillating width of the magnetic head 32 is 3 nm or less and has no adverse effect on accuracy of data reading and writing.

A second embodiment of the present invention will hereinafter be described with reference to the drawings. The second embodiment is an example of a HDD 100 having mounted six magnetic disks 122a, 122b, 122c, 122d, 122e, and 122f, but is the same as the HDD 10 of the first embodiment, except that it mounts the six magnetic disks. Therefore, an illustration of a specific structure is omitted.

For the HDD 100 of the second embodiment, as with the first embodiment, the velocities of the flows of air between magnetic disks were measured. The spaces between adjacent magnetic disks are all 1.85 mm and equal, and the rated rotational speed of the magnetic disk is 10000 rpm. The results are shown in FIG. 6. As with FIGS. 3 and 4, FIG. 6 schematically illustrates a disk assembly, which consists of magnetic disks and a spindle motor 118.

As illustrated in FIG. 6, it is found that the flow velocity in the space between the magnetic disks 112c and 122d becomes greatest. It is also found that the flow velocity becomes smaller in the order of the space between the magnetic disks 122b and 122c, the space between the magnetic disks 122d and 122e, the space between the magnetic disks 122a and 122b, and the space between the magnetic disks 122e and 122f. This tendency is the same as the HDD 10 having mounted four magnetic disks, shown in FIG. 4. That is, in the case where the spaces between magnetic disks are equal, the flow velocities in the spaces between magnetic disks are unequal and the flow velocity in the space between magnetic disks, positioned in the axially center portion of the spindle 119, becomes greatest. Using the spindle motor 118 of FIG. 6 as reference, the flow velocity in the space between the magnetic disks disposed at the position nearest to the spindle motor 118, and the flow velocity in the space between the magnetic disks disposed at the position farthest from the spindle motor 118, become smallest, and the flow velocity in the space between the magnetic disk located at the intermediate point becomes greatest. In addition, the flow velocity in the space between magnetic disks varies, depending on a distance from the position where the spindle motor 119 is supported.

Next, for the HDD 100, flutter was measured in the same manner as the first embodiment. In addition, flutter was measured with the magnetic disks 122c and 122d of the HDD 100 removed. The disk assembly of the HDD 100 is shown in FIG. 7, with the magnetic disks 122c and 122d removed. As a result, the space between the magnetic disks 122b and 122e becomes wider. Note that the magnetic heads corresponding to the removed magnetic disks 122c and 122d are also removed.

The measurement results for flutter are shown in FIGS. 8 and 9. FIG. 8 shows the measurement results for the HDD 100 having mounted six magnetic disks and FIG. 9 the measurement results for the HDD 100 having removed two center magnetic disks from the six magnetic disks shown in FIG. 7.

As illustrated in FIG. 8, it is found that the quantities of flutter for the magnetic head numbers 3 to 8 are great. These magnetic heads are disposed in the spaces where the velocity of the flow of air is great. Therefore, it is also found that there is a correlation between the flow velocity and the flutter quantity of the magnetic head.

As illustrated in FIG. 9, it is found that the HDD 100 having removed the magnetic disks 122d and 122c is smaller in flutter quantity than the HDD 100 having mounted six magnetic disks. In the HDD 100 having removed the magnetic disks 122d and 122c, the space between the magnetic disks 122b and 122e has widened as previously described. It is considered that the reason why the quantity of flutter has been reduced is that the aforementioned space has widened.

In the HDD 100 illustrated in FIG. 7, the space between the magnetic disks 122b and 122e is made greater by removing two magnetic disks 122c and 122d, disposed in the axially intermediate portion of the spindle 119, of the six magnetic disks. However, in the second embodiment, the spaces may be made unequal, while the six magnetic disks are being held. This will be described with reference to FIG. 10.

FIG. 10 shows a sectional view of a half of a disk assembly constructed by mounting magnetic disks 122a to 122f on the spindle 119 of the spindle motor 118.

As illustrated in FIG. 10, in this disk assembly the spaces between adjacent magnetic disks are set as follows:

| | |
|---|---|
| Space between magnetic disks 122c and 122d (hereinafter, space G1) | 3.0 mm |
| Space between magnetic disks 122b and 122c (hereinafter, space G2) | 2.0 mm |
| Space between magnetic disks 122d and 122e (hereinafter, space G3) | 2.0 mm |
| Space between magnetic disks 122a and 122b (hereinafter, space G4) | 1.85 mm |
| Space between magnetic disks 122e and 122f (hereinafter, space G5) | 1.85 mm |

Where the magnetic disks 122a to 122f are from the magnetic disk 122a disposed at the position nearest to the spindle motor 118 can be expressed in terms of m (m=6).

| | |
|---|---|
| Magnetic disk 122a | $\frac{1}{2} \cdot (m - 4)$th |
| Magnetic disk 122b | $\frac{1}{2} \cdot (m - 2)$nd |
| Magnetic disk 122c | $\frac{1}{2} \cdot m$th |
| Magnetic disk 122d | $\frac{1}{2} \cdot (m + 2)$nd |
| Magnetic disk 122e | $\frac{1}{2} \cdot (m + 4)$th |
| Magnetic disk 122f | $\frac{1}{2} \cdot (m + 6)$th |

Therefore, the corresponding relationship between the spaces G1 to G5 and m is expressed as follows:

| | |
|---|---|
| Space between the $\frac{1}{2} \cdot m$th and the $\frac{1}{2} \cdot (m + 2)$nd | G1 |
| Space between the $\frac{1}{2} \cdot m$th and the $\frac{1}{2} \cdot (m - 2)$nd | G2 |
| Space between the $\frac{1}{2} \cdot (m + 2)$nd and the $\frac{1}{2} \cdot (m + 4)$th | G3 |
| Space between the $\frac{1}{2} \cdot (m - 2)$nd and the $\frac{1}{2} \cdot (m - 4)$th | G4 |
| Space between the $\frac{1}{2} \cdot (m + 4)$th and the $\frac{1}{2} \cdot (m + 6)$th | G5 |

From the foregoing description, the space G1 between the $\frac{1}{2} \cdot m$th magnetic disk 122c and the $\frac{1}{2} \cdot (m+2)$nd magnetic disk 122d is set greater than the other spaces between magnetic disks. In addition, the following relationship is established.

Space G1>space G2>space G4

Space G1>space G3>space G5

While a description has been made of m=6, the present invention is not limited to this. In the case where m is an even number greater than 6, the spaces between magnetic disks can be set so that a similar relationship is obtained. Note that since the spaces between magnetic disks are regulated by the thickness of the spacers 124, the above-mentioned relationship can be likewise applied to the thickness of the spacers 124. For example, when the thickness of the spacer 124 disposed in the space G1 is represented by t1 and the thickness of the other spacers 124 in the other spaces G2 to G5 by t2, t1 becomes greater than t2.

Although, in the example shown in FIG. 10, space G2=space G3 and space G4=space G5, the present invention is not limited to this example. For instance, the spaces can be set as shown in FIG. 11.

Space G1=3.0 mm, space G2=2.15 mm, space G33=2.0 mm

Space G4=1.85 mm, space G5=1.75 mm

It can be safely stated that the values of the spaces G1 to G5 are set based on the velocities of the flows of air in the spaces shown in FIG. 6. That is, the values of the spaces G1 to G5 are determined according to the magnitude of the flow velocity in the case where magnetic disks are disposed at equal spaces. By setting the spaces G1 to G5 in this manner, it becomes possible to make the flow velocities in the spaces equal. If done in this way, it becomes possible to equalize the flutters of the magnetic heads that occur in the spaces.

While the aforementioned first and second embodiments have been described with reference to the HDD 10 and HDD 100 having mounting an even number of magnetic disks, a third embodiment will be described with reference to a HDD 200 having mounted an odd number of magnetic disks.

The third embodiment is an example of the HDD 200 having mounted five magnetic disks, but since it is the same as the first embodiment except that magnetic disks 222a, 222b, 222c, 222d, and 222e are mounted, an illustration of a specific structure is omitted.

FIG. 12 is a half sectional view of a main part of the HDD 200 according to a third embodiment. As shown in FIG. 12, the third embodiment is provided with a disk assembly constructed by mounting five disks 222a to 222e on the spindle 119 of the spindle motor 118.

And, the spaces between adjacent magnetic disks are set as follows:

| | |
|---|---|
| Space between magnetic disks 222a and 222b (hereinafter, space G13) | 2.0 mm |
| Space between magnetic disks 222b and 222c (hereinafter, space G11) | 3.0 mm |
| Space between magnetic disks 222c and 222d (hereinafter, space G12) | 3.0 mm |
| Space between magnetic disks 222d and 222e (hereinafter, space G14) | 2.0 mm |

As with the second embodiment, where the magnetic disks 222a to 222e are from the magnetic disk 122a disposed at the position nearest to the spindle motor 218 can be expressed in terms of n (n=5).

| | |
|---|---|
| Magnetic disk 222a | $\frac{1}{2} \cdot (n - 3)$rd |
| Magnetic disk 222b | $\frac{1}{2} \cdot (n - 1)$st |
| Magnetic disk 222c | $\frac{1}{2} \cdot (n + 1)$st |
| Magnetic disk 222d | $\frac{1}{2} \cdot (n + 3)$rd |
| Magnetic disk 222e | $\frac{1}{2} \cdot (n + 5)$th |

Therefore, the corresponding relationship between the spaces G11 to G14 and n is expressed as follows:

| | |
|---|---|
| Space between the $\frac{1}{2} \cdot (n - 3)$rd and the $\frac{1}{2} \cdot (n - 1)$st | G13 |
| Space between the $\frac{1}{2} \cdot (n - 1)$st and the $\frac{1}{2} \cdot (n + 1)$st | G11 |
| Space between the $\frac{1}{2} \cdot (n + 1)$st and the $\frac{1}{2} \cdot (n + 3)$rd | G12 |
| Space between the $\frac{1}{2} \cdot (n + 3)$rd and the $\frac{1}{2} \cdot (n + 5)$th | G14 |

In the third embodiment, therefore, the space between the $\frac{1}{2} \cdot (n-1)$st disk and the $\frac{1}{2} \cdot (n+1)$st disk, and the space between the ½·(n+1)st disk and the ½·(n+3)rd disk, are set greater than the other spaces between magnetic disks.

While the third embodiment has been described with regard to the HDD 200 having mounted five magnetic disks 222, the present invention is also applicable to a HDD 200 having mounted an odd number of magnetic disks (seven or more magnetic disks). It can be easily understood that in the HDD 200 having mounted an odd number of magnetic disks (seven or more magnetic disks), the space between the ½·(n−1)st disk and the ½·(n+1)st disk, and the space between the ½·(n+1)st disk and the ½·(n+3)rd disk, can be set greater than the other spaces between magnetic disks.

As has been described above, the present invention provides a disk drive that is capable of reducing the velocity of the flow of air which occurs near magnetic disks during rotation of the magnetic disks so that the occurrence of flutter can be suppressed. In addition, the present invention provides a disk drive which, in a HDD equipped with a plurality of magnetic disks, can equalize the velocities of the flows of air between magnetic disks.

What is claimed is:

1. A disk drive comprising:

a spindle;

a motor attached to said spindle for rotatably turning said spindle along an axis of said spindle; and a plurality of disk storage media disposed coaxially along said axis of said spindle, wherein a distance between a first and a second one of said plurality of disk storage media is greater than a distance between said second and a third one of said plurality of disk storage media, and said distance between said second and said third one of said plurality of disk storage media is greater than a distance between said third and a fourth one of said plurality of disk storage media, wherein said first, second, third and fourth one of said plurality of disk storage media are located adjacent to each other consecutively in said order.

2. The disk drive of claim 1, wherein said motor has a rated rotational speed of 10,000 rpm.

3. A hard disk drive comprising:

a spindle a motor attached to said spindle for rotatably turning said spindle along an axis of said spindle; and at least five disks disposed coaxially along said axis of said spindle, wherein a distance between a first and a second one of said at least five disks is the same as a distance between a fourth and a fifth one of said at least five disks, and a distance between said second and a third one of said at least five disks is the same as a distance between said third and said fourth one of said at least five disks.

4. The hard disk drive of claim 3, wherein said first, second, third, fourth and fifth of said at least five disks are located adjacent to each other consecutively in said order.

5. The hard disk drive of claim 3, wherein said motor has a rated rotational speed of 10,000 rpm.

* * * * *